Feb. 6, 1962   J. KINGSBURY   3,020,016
ARRANGEMENTS FOR MOUNTING OBJECTS
Filed May 29, 1959   2 Sheets-Sheet 2

*Inventor*
*John Kingsbury*
By
*Attorneys*

United States Patent Office 3,020,016
Patented Feb. 6, 1962

3,020,016
ARRANGEMENTS FOR MOUNTING OBJECTS
John Kingsbury, Cambridge, England, assignor to Pye Limited, Cambridge, England, a British company
Filed May 29, 1959, Ser. No. 816,866
Claims priority, application Great Britain June 6, 1958
12 Claims. (Cl. 248—183)

The present invention relates to arrangements for mounting objects whose position it is required to adjust by tilting.

It is an object of the invention to provide means for mounting scientific instruments in such a manner that they may be tilted whilst maintaining a reference point on the instrument in the same plane.

Another object of the invention is to mount an object in such a manner that it can be tilted but still maintain its centre of gravity in a horizontal plane whatever be the angle of tilt.

From one aspect the invention provides an arrangement for mounting an object to tilt, comprising a support therefor pivoted to a member carried by a bearing member that allows the said member to move in a vertical direction, and cam and cam follower means arranged between the said support and the said bearing member and wherein said cam follower follows a straight line path in such a manner that a reference axis on said object is located substantially in the same horizontal plane whatever the angle of tilt of the object as a whole.

From another aspect the invention provides an arrangement for mounting an object to tilt, comprising a support pivoted to a member carried by a bearing member such that said member may move in a vertical direction and cam follower means between said support and said bearing member the arrangement being such that the line joining the centre of curvature of the cam follower to the intersection of the line of movement of the pivot and the horizontal plane including a reference point on the object forms a right angle with the line passing through the centre of curvature of said cam follower and said pivot.

From another aspect the invention provides an arrangement for mounting an object to tilt or swing, comprising a support pivoted to a member carried by a bearing member such that said member may move and that the path of movement of said pivot is defined by a line normal to a desired plane in which the reference point of said object is to be maintained, and cam and cam follower means so positioned that a line from the pivot centre to the reference point constitutes the hypotenuse of a right-angled triangle whose other sides are formed by lines joining the centre of curvature of the cam follower to the pivot and the centre of curvature of the cam follower to the reference point.

These and other objects and features of the invention will be more clearly understood by reference to the accompanying drawings which show certain embodiments thereof by way of example and in which.

Figure 1:
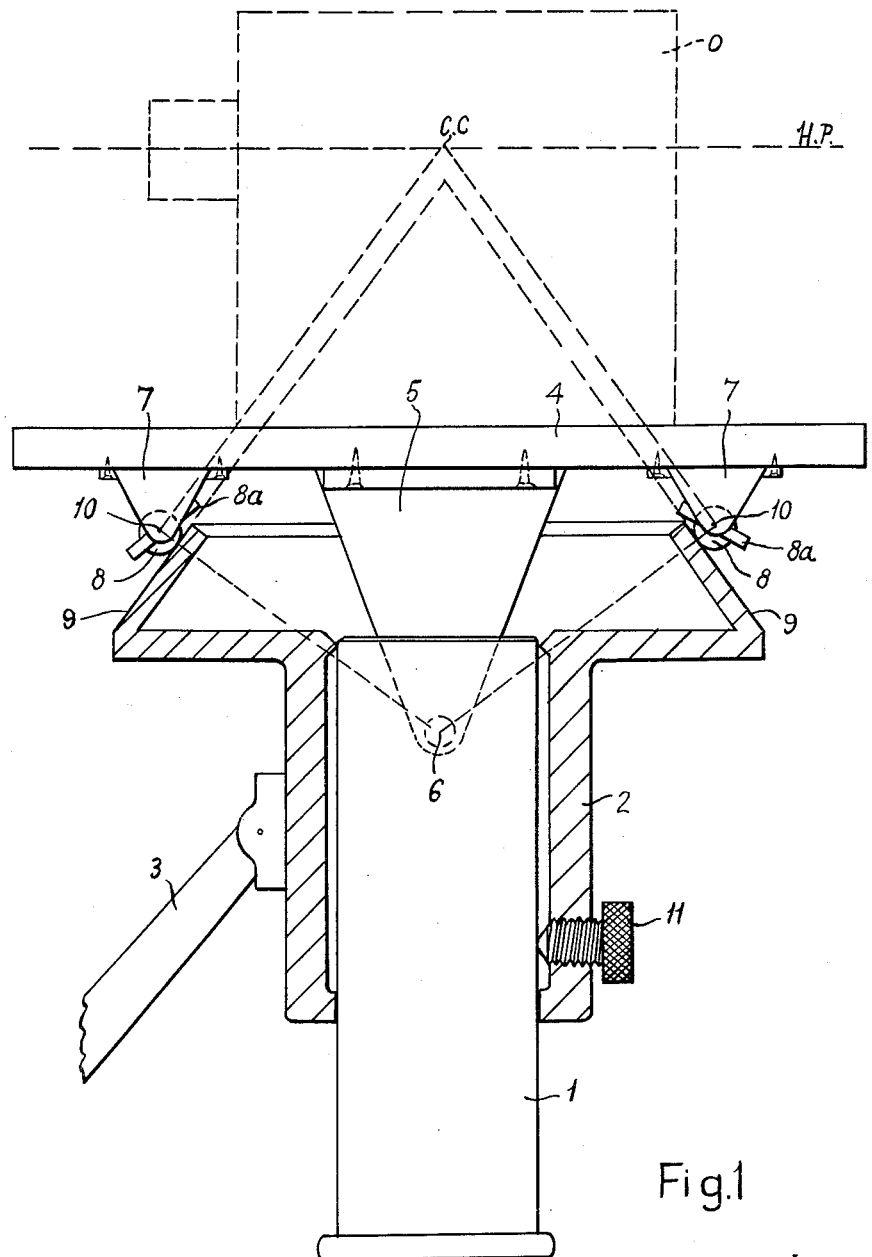
FIGURE 1 is a part-sectional side view of a first embodiment.

In the drawings the invention is shown as applied to a tripod head for a heavy device such as a television camera but it will be quite apparent that such a use is only given as an example and that many other devices could be mounted in the arrangement according to the invention if so desired. For example the invention could also be used for mounting photographic or cinematographic cameras, surveyor's theodolites and other scientific instruments which it may be desirable to tile whilst still maintaining the centre of gravity substantially in the same horizontal plane. Further embodiments are contemplated in which means are provided to tilt or swing an object in a required manner whilst maintaining some reference point in the object in a required plane. The reference point need not necessarily be the centre of gravity. Such an arrangement might be useful for a mechanical application such as a gauge or scribe device.

Referring to the drawings, FIGURE 1 shows the centre pillar 1 of a tripod head which is arranged to be slidably mounted within a tripod body 2 to which the legs of the tripod are attached, one of which is shown at 3. Thus, the body 2 forms a bearing member and the pillar 1 a guide member. An object supporting platform 4 which may carry clamping brackets or other devices (not shown) for securing an object thereon shown dotted at 0 is provided with a depending flange 5 whereby it may be pivoted to the pillar 1 by means of a pivot spindle 6. Suitable bearings are preferably arranged between the spindle 6 and an aperture in the flange 5, but these have not been illustrated.

At the front and rear of the platform there are provided brackets 7 each holding a ball 8 in a bearing cup 8a one of the balls 8 is always in contact with a bevelled portion 9 circumferentially formed on the tripod body 2. In the horizontal position of platform 4 both balls 8 contact portion 9.

When the platform 4 is tilted in one direction or the other about the pivot 6 the leading ball 8 exerts pressure on the portion 9 so that the pillar 1 is raised or lowered as the case may be in a vertical direction in the body 2 and the location of the balls 8 and the disposition and angle of the bevelled portion 9 are such that during such tilting movement the centre of gravity of the device carried by the platform always remains in the same horizontal plane.

This desired effect is brought about if the line joining the centre of curvature of the ball, i.e. the centre 10 thereof, to the intersection of the line of movement of the pivot 6 during its vertical travel, and horizontal plant H.P. that contains the centre of gravity C.G. of the object 0 on the platform forms a right angle with the line that passes through the said centre point 10 and the pivot 6.

Clamping means schematically illustrated at 11 are provided for clamping the pillar in a selected position of tilt and/or rotation of the platform 4.

In order to allow for different objects to be carried on the platform and still obtain the benefits of the arrangement it is necessary that means be provided either for adjusting the angle of the bevelled portion 9 of the tripod body 2 or, alternatively for altering the spacing of the balls 8 from the platform 4, or both expedients may be employed together.

In order to vary the angle of the bevelled portion a series of slip rings may be provided of varying angles and adapted to be fitted on the tripod body 2 when the equipment to be supported is changed.

In order to provide means for varying the spacing of cam follower roller from the platform the brackets 7 may be readily removable and replaceable by differently dimensioned brackets carrying other new balls.

It will be seen that the bevelled portion 9 constitutes a cam and that the balls 8 constitute cam followers moving in a straight line path during tilting, and that the pillar 1 is constrained to move in one direction.

Whatever be the method of adjustment, it is apparent that all the said replaceable parts will have to be carefully calculated in dimension for the objects for which they are to be suited.

The bevelled portion 9 allows the platform to be swung about a vertical axis represented by the longitudinal axis of the pillar 1, without disturbing the balance of the object O, as there will always be contact between one ball 8 and the portion 9.

Figure 2:
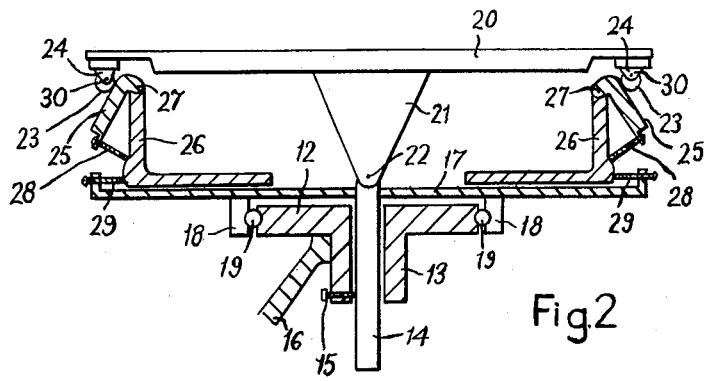
FIGURE 2 is a part-sectional side view of a second embodiment.

Referring now to FIGURE 2 there is shown a modification of the device of FIGURE 1 which obviates the necessity for a peripherally bevelled portion 9 on the tripod body. In this figure, which is largely schematic, the tripod body is shown at 12 and comprises a vertical portion 13 which is hollow to receive the vertically moveable pillar 14. A clamp 15 is provided to clamp the pillar 14 in its position of adjustment. Legs are attachable to the tripod body 12, one being shown at 16.

Mounted to rotate on the tripod head 12 is a turntable 17 having a depending flange 18 whereby a ball race schematically illustrated at 19 may be fitted between the said flange and the edge of the tripod head 12 as shown.

The platform for the object as shown at 20 and its depending flange at 21, pivoted to the pillar 14 at 22.

Each end of the platform 20 is provided with a cam follower roller 23 mounted in suitable brackets 24 which may be adjustable to vary the spacing of the rollers from the platform and/or from the pillar 14. The cam follower rollers 23 bear upon cam surfaces 25 one at each end of the platform 20 and these may be in the form of a plate having a width which need be only a little greater than the axial length of the rollers 23. The cam surfaces 25 are pivoted each to a carrier member 26 at the point 27 whereby the angle of the cam members 25 may be varied by rotating them about the pivots 27. To retain the cams in a position of adjustment tilt screws 28 are provided which abut against the sides of the carrier members 26 as shown. In addition, in order to move the cam surfaces 25 in a direction parallel to the platform so as to provide greater variety in adjustment, the carrier members 26 are adjustably translatable on the turntable 17 by means of the adjustment screws 29. For this purpose the carrier members 26 are supported in longitudinal guides which, however, are not shown on the drawing.

The operation of the device is similar to an operation of the arrangement of FIGURE 1 but whereas in FIGURE 1 "panning" of the tripod head about a vertical axis is accommodated by the peripherally bevelled portion 9 of the tripod head in conjunction with the cam follower balls 8, in FIGURE 2 panning is effected by means of the separate turntable 17 which can be rotated by hand with respect to the tripod head 12. The pivot centre of the rollers 23 is shown at 30 and this point constitutes the centre of contact of the roller.

Figure 3:
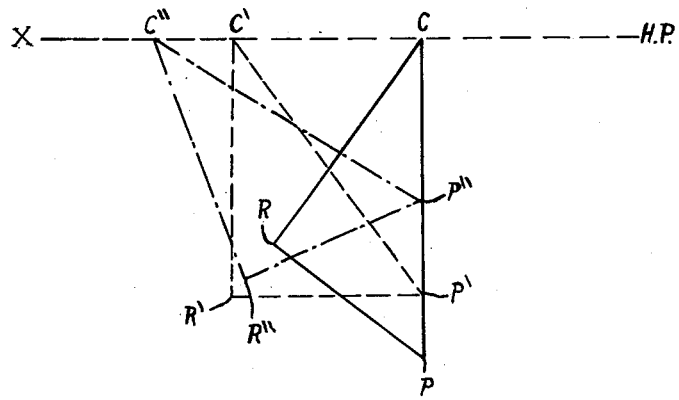
FIGURE 3 is a diagram showing the geometrical disposition of relevant parts for varying positions of the mounting.

Referring now to the geometrical diagram of FIGURE 3, R represents the centre of curvature 10 or 30, P represents the centre point of pivot 6 or 22 and C represents a point in the horizontal plate HP containing the centre of gravity of the object. Three positions of tilt are shown, the full line position representing a horoizontal condition of the platform where the point C corresponds to the centre of gravity of the object and the dotted and chain-dotted positions representing two different forward tilt positions of the platform. X is a point on HP produced.

In accordance with the invention, the angle CRP is always a right angle and it can be shown that in such a condition the points C, C' and C'' always lie on a substantially horizontal plane H.P., i.e. when the platform is horizontal the angle PCX is a right angle, while the various positions taken up by the centre of curvature 10 lie in the straight line CR produced. In other words, if CRP is a right angle and the point R follows a straight line path, R', R'', then the centre of gravity will always be in a horizontal plane, C, C', C''. Moreover, a line from the centre point P of the pivot to the reference point C constitutes the hypotenuse of a right-angled triangle whose other sides are formed by lines joining the centre of curvature R of the cam follower to the pivot P and the centre of curvature of the cam follower to the reference point.

If desired, the cam followers may be pegs or rods capable of touching the cam surface. From a practical point of view such as peg or rod would have a rounded end to prevent damage to the cam surface, even if the peg or rod were pointed.

It will be apparent that the invention has been described only by way of example and that various modifications may be made to the specific details set forth without in any way departing from its scope. For example, two opposing sets of cams and cam followers may be provided, one set at right angles to the other, so that the supported object could be tilted in front to rear or sideward directions, still maintaining a reference point in a desired plane.

I claim:

1. An arrangement for mounting an object to tilt, comprising an object support, a bearing member, a guide member carried by said bearing member for reciprocating movement therein, a pivot pivoting said object support to said guide member for tilting movement with respect thereto, the path of movement of said pivot with said guide member being defined by a line normal to a desired plane in which a reference point on said object is to be maintained, and cam and curved cam follower means on said object support and said bearing member for mutual cooperation, said cam and cam follower means being located such that a line from the centre of said pivot to said reference point constitutes the hypotenuse of a right-angled triangle whose other sides are formed by lines joining the centre of curvature of the cam follower to the pivot and the centre of curvature of said cam follower to said reference point.

2. An arrangement for mounting an object to tilt, comprising an object support, a bearing member, a guide member carried by said bearing member for reciprocating movement therein, a pivot pivoting said object support to said guide member for tilting movement with respect thereto, the path of movement of said pivot with said guide member being defined by a line normal to a desired plane in which a reference point on said object is to be maintained, a cam member providing a cam surface in said bearing member and rotary cam follower means on said object support, said cam member and said cam follower means being in contact and located such that a line from the centre of said pivot to said reference point constitutes the hypotenuse of a right-angled triangle whose other sides are formed by lines joining the axis of rotation of the cam follower to the pivot and the axis of rotation of said cam follower to said reference point.

3. An arrangement for mounting an object to tilt and swing, comprising an object support, a bearing member, a guide member carried by said bearing member for reciprocating movement therein, a pivot pivoting said object support to said guide member for tilting movement with respect thereto, the path of movement of said pivot with said guide member being defined by a line normal to a desired plane in which a reference point on said object is to be maintained, cam and rotary cam follower means on said object support and said bearing member for mutual cooperation, said cam and cam follower means being located such that a line from the centre of said pivot to said reference point constitutes the hypotenuse of a right-angled triangle whose other sides are formed by lines joining the axis of rotation of the cam follower to the pivot and the axis of rotation of said cam follower to said reference point, and means pivoting said object support for rotary movement thereof with respect to said bearing member.

4. An arrangement for mounting an object to tilt, comprising an object support, a bearing member, a guide member carried by said bearing member for reciprocating movement with respect thereto, a pivot pivoting said object support to said guide member for tilting movement thereof with respect to said guide member, and cam and cam follower means on said object support and said bearing member for mutual co-operation, said cam defining a straight line path for said cam follower means to follow, whereby a reference axis on an object carried by said object support is located substantially in the same plane normal to the direction of reciprocating movement of said guide member whatever the angle of tilt of the object as a whole, said pivot and said reference axis being spatially separated.

5. An arrangement for mounting an object to tilt, comprising an object support, a bearing member, a guide member carried by said bearing member for reciprocating movement therein, a pivot pivoting said object support to said guide member for tilting movement thereof with respect to said guide member, a cam member providing a cam surface on said bearing member, and cam follower means on said object support, said cam surface defining a straight line path for said cam follower means to follow whereby a reference axis on an object carried by said object support is located substantially in the same plane normal to the direction of reciprocating movement of said guide member whatever the angle of tilt of the object as a whole, said pivot and said reference axis being spatially separated.

6. An arrangement for mounting an object to tilt, comprising an object support, a bearing member, a guide member carried by said bearing member for reciprocating movement therein, a pivot pivoting said object support to said guide member for tilting movement thereof with respect to said guide member, a cam member providing a cam surface on said bearing member, cam follower means on said object support, said cam surface defining a straight line path for said cam follower means to follow whereby a reference axis on an object carried by said object support is located substantially in the same plane normal to the direction of reciprocating movement of said guide member whatever the angle of tilt of the object as a whole, said pivot and said reference axis being spatially separated, and clamping means on said bearing member engageable with said guide member to clamp the latter in a selected position.

7. An arrangement for mounting an object to tilt so that a reference point on said object will be maintained in a desired plane, comprising an object support, a bearing member, a guide member carried by said bearing member for reciprocating movement with respect thereto, a pivot pivoting said object support to said guide member for tilting movement thereof with respect to said guide member, the path of movement of said pivot with said guide member being defined by a line normal to said desired plane, and cam and cam follower means on said object support and said bearing member for mutual co-operation, said cam defining a straight line path in the direction of tilt for said cam follower means to follow, and said cam and cam follower means being so located that a line from the centre of said pivot to said reference point constitutes the hypotenuse of a right angled triangle whose other sides are formed by lines joining a point on the cam follower, which is caused to move in a straight line when said object support is tilted and the cam follower follows the cam, to the centre of the pivot and to said reference point.

8. An arrangement for mounting an object to tilt so that a reference point on said object will be maintained in a desired plane, comprising an object support, a bearing member, a guide member carried by said bearing member for reciprocating movement with respect thereto, a pivot pivoting said object support to said guide member for tilting movement thereof with respect to said guide member, the path of movement of said pivot with said guide member being defined by a line normal to said desired plane, and cam and cam follower means on said object support and said bearing member for mutual co-operation, said cam defining a straight line path in the direction of tilt for said cam follower means to follow, and said cam and cam follower means being so located that a line from the reference point to a point on the cam follower caused to move in a straight-line when said object support is tilted and the cam follower follows the cam, will form approximately a right angle with the line from said point of said cam follower to the centre of the pivot.

9. An arrangement for mounting an object to tilt so that a reference point on said object will be maintained in a desired plane, comprising an object support, a bearing member, a guide member carried by said bearing member for reciprocating movement therein, a pivot pivoting said object support to said guide member for tilting movement thereof with respect to said guide member, the path of movement of said pivot with said guide member being defined by a line normal to said desired plane, a cam member providing a cam surface on said bearing member, cam follower means on said object support, said cam surface defining a straight line path in the direction of tilt for said cam follower means to follow, and said cam member and said cam follower means being so located that a line from said reference point to a point on the cam follower caused to move in a straight line when said object support is tilted and the cam follows said cam surface, will form approximately a right angle with the line from said point on said cam follower to the centre of the pivot, and clamping means on said bearing member engageable with said guide member to clamp the latter in a selected position.

10. An arrangement for mounting an object to tilt and swing so that a reference point on said object will be maintained in a desired plane, comprising an object support, a bearing member, a guide member carried by said bearing member for reciprocating movement therein, a pivot pivoting said object support to said guide member for tilting movement thereof with respect to said guide member, the path of movement of said pivot with said guide member being defined by a line normal to said desired plane, means mounting said object support for rotary movement thereof with respect to said bearing member, and cam and cam follower means on said object support and said bearing member for mutual co-operation in all positions of rotation of said object support with respect to said bearing member, said cam, in all said positions, defining a straight line path for said cam follower to follow when the object support is tilted, said cam and cam follower means being so located that a line from said reference point to a point on the cam follower caused to move in a straight line when said support is tilted and the cam follower follows the cam, will form a right angle with the line from said point on the cam follower to the centre of said pivot.

11. An arrangement for mounting an object to tilt and swing so that a reference point on said object will be maintained in a desired plane, comprising an object support, a bearing member, a guide member carried by said bearing member, for reciprocating and rotary movement therein, a pivot pivoting said object support to said guide member for tilting movement thereof with respect to said guide member, the path of movement of said pivot with said guide member being defined by a line normal to said desired plane, a cam surface on said bearing member, rotary cam follower means on said object support, said cam surface co-operating with said cam follower means in all positions of rotation of said guide member with respect to said bearing member, and, in all said positions, defining a straight line path for said cam follower to follow when the object support is tilted, said cam surface and said cam follower means being so located that a line from said reference point to the axis of rotation of the cam follower will form a right angle with the line from said axis of rotation of the cam follower to the centre of said pivot, and clamping means on said bearing member engageable with said guide member to clamp the latter in a selected position.

12. An arrangement for mounting an object to tilt, comprising an object support, a bearing member, a guide member carried by said bearing member for reciprocating movement therein, a pivot pivoting said object support to said guide member for tilting movement thereof in one direction with respect to said guide member, the path of movement of said pivot with said guide member being defined by a line normal to a desired line in which a reference point on said object is to be maintained when the object support is tilted, and cam and cam follower means on said object support and said bearing member for mutual co-operation, said cam means defining a straight line path in the direction of tilt for said cam follower means to follow, and said cam means and cam follower means being so located that a line from said reference point to a point on said cam follower means caused to move in a straight line when said support is tilted and said cam follower means follows the cam means, will form approximately a right angle with the line from said point on the cam follower means to the centre of said pivot.

References Cited in the file of this patent

UNITED STATES PATENTS

| | | |
|---|---|---|
| 2,534,623 | Pitts | Dec. 19, 1950 |
| 2,796,226 | Dalton et al. | June 18, 1957 |